(12) United States Patent
Chida

(10) Patent No.: US 6,313,863 B1
(45) Date of Patent: *Nov. 6, 2001

(54) IMAGE COMMUNICATION APPARATUS AND SYSTEM

(75) Inventor: Makoto Chida, Kunitachi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/507,983

(22) Filed: Jul. 27, 1995

(30) Foreign Application Priority Data

Jul. 29, 1994 (JP) .................................................... 6-179213
Jul. 29, 1994 (JP) .................................................... 6-179214

(51) Int. Cl.[7] ................................. H04N 7/14; H04N 7/12
(52) U.S. Cl. ............................... 348/14.01; 348/14.12; 348/14.1; 348/14.13; 348/14.14; 348/14.15; 348/14.16; 725/10
(58) Field of Search ........................... 348/13, 14, 15, 348/16, 17, 18, 19, 20, 700, 701, 154, 155, 431, 452, 399, 397, 469; 455/5.1; 345/122; H04N 7/14, 7/12

(56) References Cited

U.S. PATENT DOCUMENTS

| | | | |
|---|---|---|---|
| 4,692,801 | * | 9/1987 | Ninomiya et al. ................ 348/425 |
| 4,935,953 | * | 6/1990 | Appel et al. ..................... 379/53 |
| 4,937,668 | * | 6/1990 | Hosaka ............................ 348/315 |
| 5,034,816 | * | 7/1991 | Morita et al. ..................... 348/559 |
| 5,150,432 | * | 9/1992 | Ueno et al. ....................... 348/438 |
| 5,233,422 | * | 8/1993 | Kondo et al. ..................... 348/558 |
| 5,247,353 | * | 9/1993 | Cho et al. ........................ 348/431 |
| 5,371,536 | * | 12/1994 | Yamaguchi ....................... 348/169 |
| 5,453,780 | * | 9/1995 | Chen et al. ....................... 348/15 |
| 5,463,422 | * | 10/1995 | Simpson et al. ................... 348/390 |
| 5,473,740 | * | 12/1995 | Kasson ............................ 348/134 |
| 5,500,654 | * | 3/1996 | Fujimoto ......................... 345/132 |
| 5,508,747 | * | 4/1996 | Lee ................................ 348/444 |
| 5,512,939 | * | 4/1996 | Zhou .............................. 348/14.12 |
| 5,519,436 | * | 5/1996 | Munson ........................... 348/19 |
| 5,548,322 | * | 8/1996 | Zhou .............................. 348/14.01 |
| 5,587,927 | * | 12/1996 | Nagao et al. ..................... 364/514 |
| 5,592,228 | * | 1/1997 | Dachiku et al. ................... 348/416 |
| 5,594,494 | * | 1/1997 | Okada et al. ..................... 348/15 |
| 5,699,121 | * | 12/1997 | Zakhor et al. .................... 348/417 |
| 5,710,590 | * | 1/1998 | Ichige et al. ..................... 348/17 |
| 5,729,295 | * | 3/1998 | Okada ............................ 348/420 |
| 5,757,418 | * | 5/1998 | Inagaki ........................... 348/15 |
| 5,802,220 | * | 9/1998 | Black et al. ...................... 382/276 |
| 5,926,575 | * | 7/1999 | Ohzeki et al. .................... 382/243 |
| 6,026,182 | * | 2/2000 | Lee et al. ......................... 382/173 |

FOREIGN PATENT DOCUMENTS

212563 * 3/1987 (EP) .

* cited by examiner

Primary Examiner—Reinhard J. Eisenzopf
Assistant Examiner—Linus H. Lo
(74) Attorney, Agent, or Firm—Fitzpatrick, Cella, Harper & Scinto

(57) ABSTRACT

A combined image is made up of a static image and a motion image. An area of the static image is replaced by the motion image to form the combined image. The combined image is then coded and transmitted from one communication partner to another communication partner by way of a network.

12 Claims, 16 Drawing Sheets

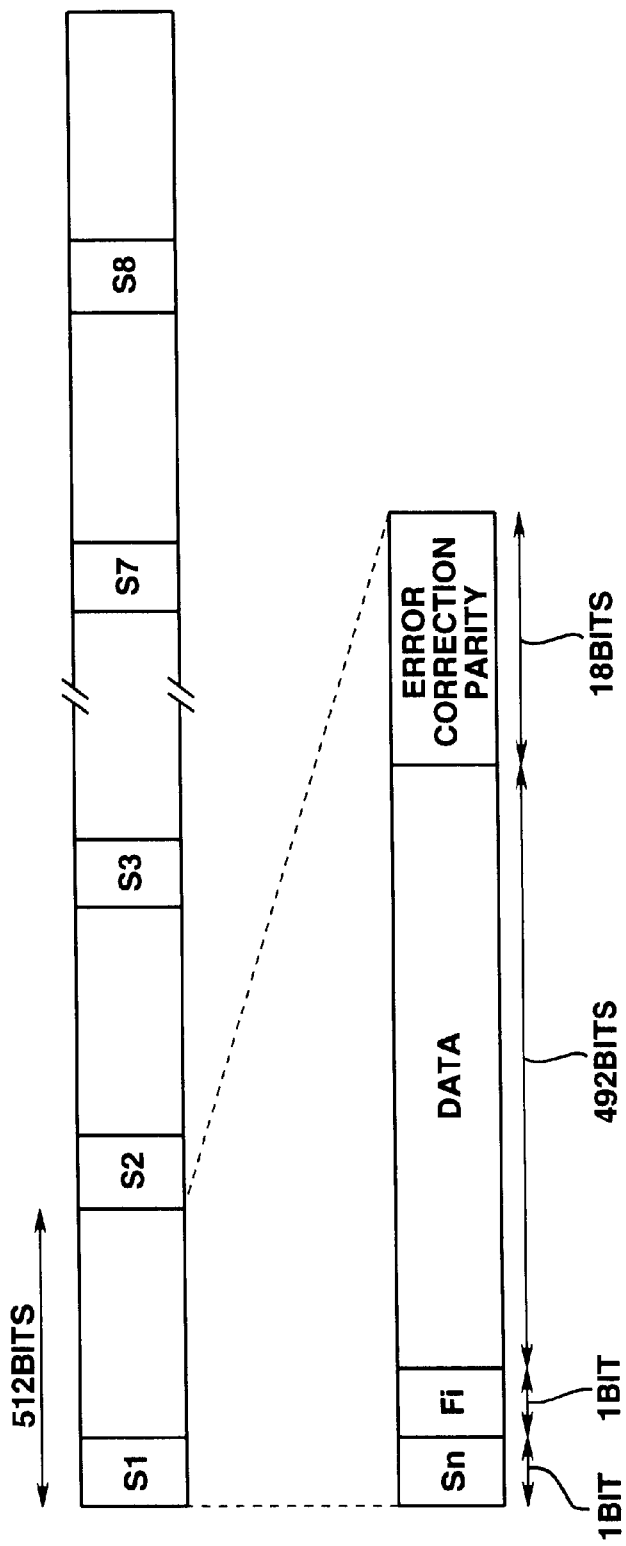

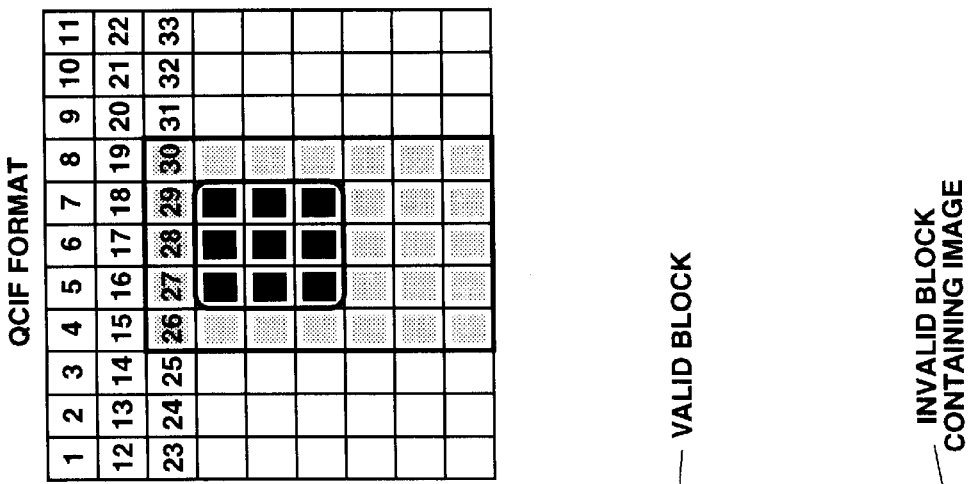
FIG.7(b) QCIF FORMAT
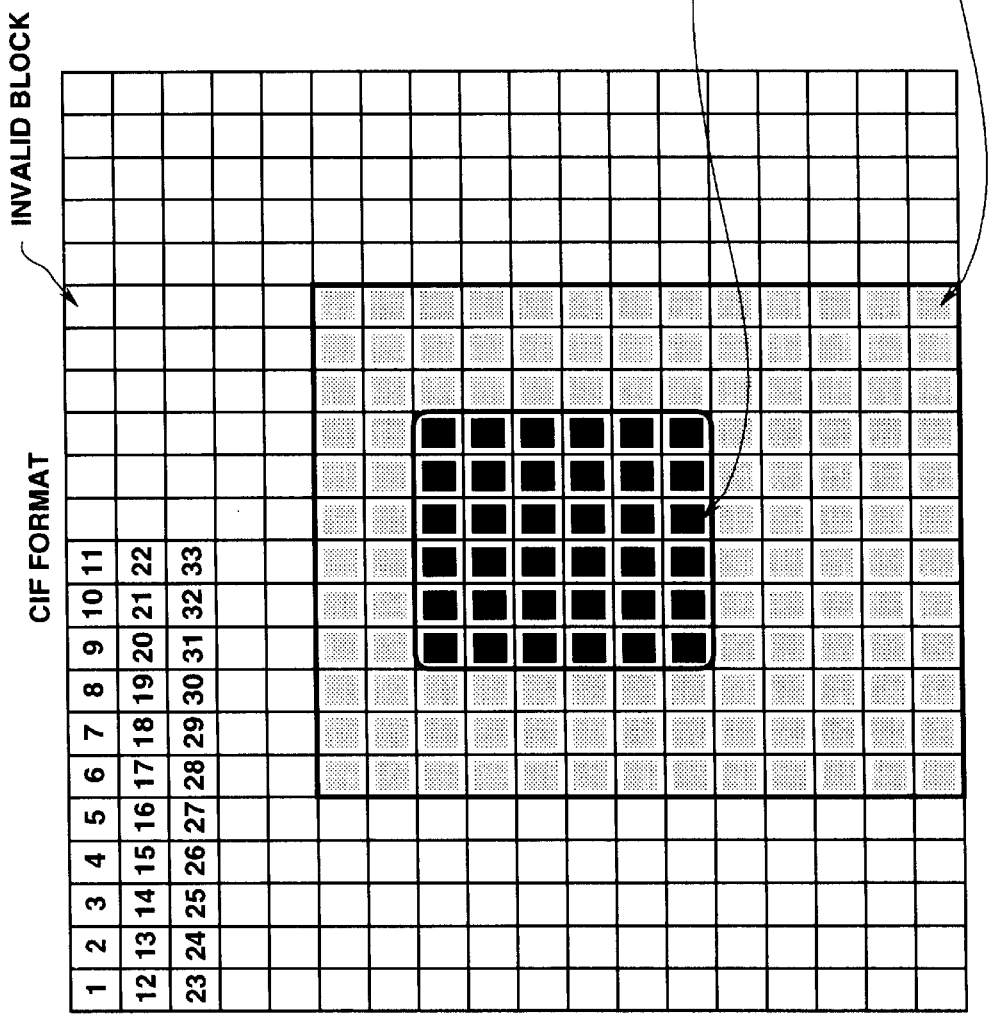
FIG.7(a) CIF FORMAT

FIG.9

| MB NUMBER | | | VALID (○) INVALID (×) | SPECIAL IMAGE DATA EXISTENCE | CONTENT OF SPECIAL IMAGE |
|---|---|---|---|---|---|
| GOB NO. | START MB NO. | END MB NO. | | | |
| 1 | — | — | × | × | |
| 2 | — | — | × | × | |
| 3 | 1 | 27 | × | × | |
| 3 | 28 | 33 | × | ○ | CCC |
| 4 | 1 | 22 | × | × | |
| 4 | 23 | 28 | × | ○ | CCC |
| 4 | 29 | 33 | × | × | |
| 5 | 1 | 5 | × | × | |
| 5 | 12 | 16 | × | × | |
| 5 | 23 | 27 | × | × | |
| 5 | 6 | 11 | × | ○ | CCC |
| 5 | 17 | 19 | × | ○ | CCC |
| 5 | 28 | 30 | × | ○ | CCC |
| 5 | 20 | 22 | ○ | × | |
| 5 | 31 | 33 | ○ | × | |
| 6 | 1 | 6 | × | ○ | CCC |
| 6 | 7 | 11 | × | × | |
| 6 | 12 | 14 | ○ | × | |
| 6 | 15 | 17 | × | ○ | CCC |
| 6 | 18 | 22 | × | × | |
| 6 | 23 | 25 | ○ | × | |
| 6 | 26 | 28 | × | ○ | CCC |
| 6 | 29 | 33 | × | × | |
| | | | | | |
| | | | | | |
| ⋮ | ⋮ | ⋮ | ⋮ | ⋮ | |

FIG.10

| MB NUMBER | | | VALID (○) INVALID (×) | SPECIAL IMAGE DATA EXISTENCE | CONTENT OF SPECIAL IMAGE |
|---|---|---|---|---|---|
| GOB NO. | START MB NO. | END MB NO. | | | |
| 1 | 26 | 30 | × | ○ | CCC |
| 3 | 4 | 4 | × | ○ | CCC |
| 3 | 8 | 8 | × | ○ | CCC |
| 3 | 15 | 15 | × | ○ | CCC |
| 3 | 19 | 19 | × | ○ | CCC |
| 3 | 26 | 26 | × | ○ | CCC |
| 3 | 5 | 7 | ○ | × | |
| 3 | 16 | 18 | ○ | × | |
| 3 | 27 | 29 | ○ | × | |
| 5 | 4 | 8 | × | ○ | CCC |
| 5 | 15 | 19 | × | ○ | CCC |
| 5 | 26 | 30 | × | ○ | CCC |
| GOBNOS. EXCEPT FOR ABOVE NOS | — | — | × | × | |

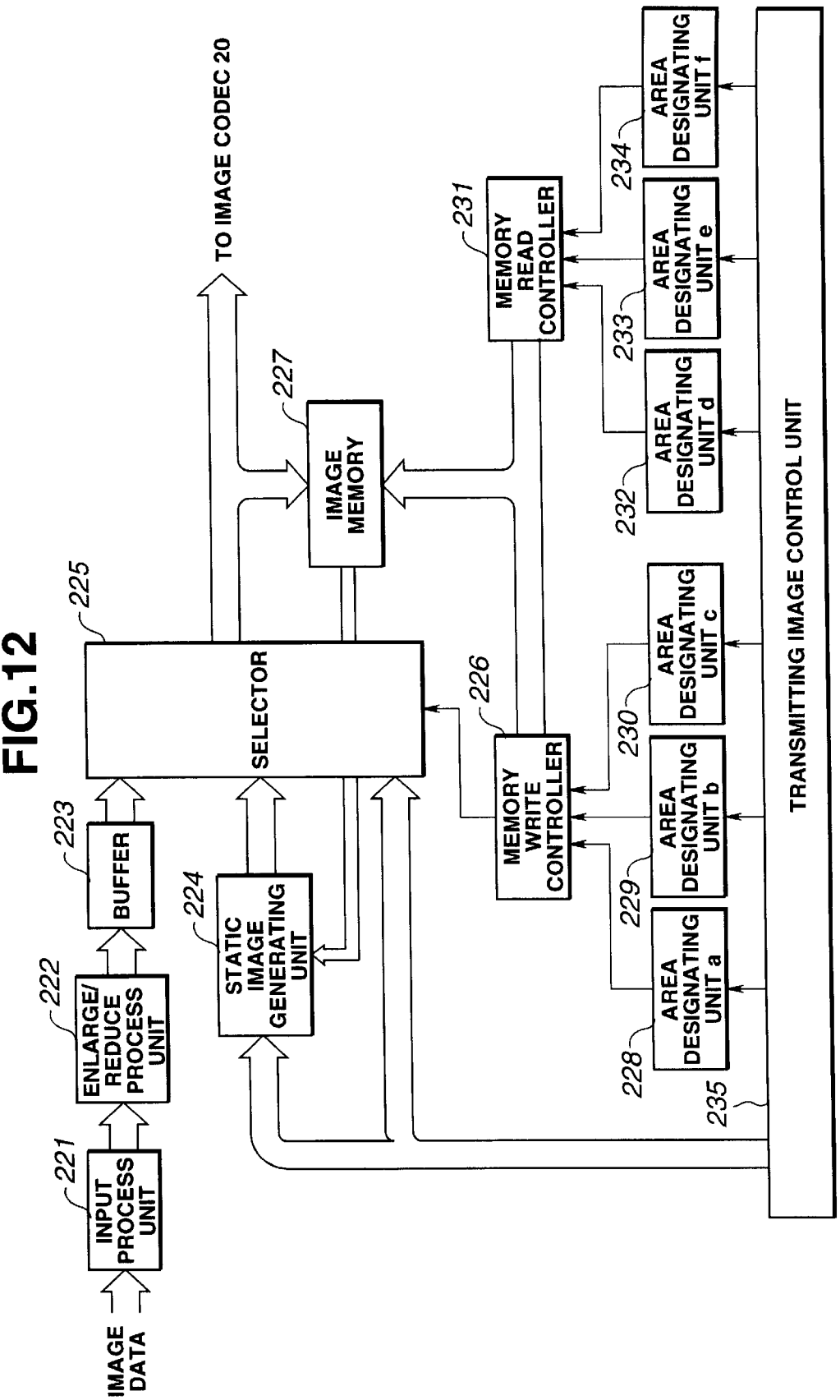

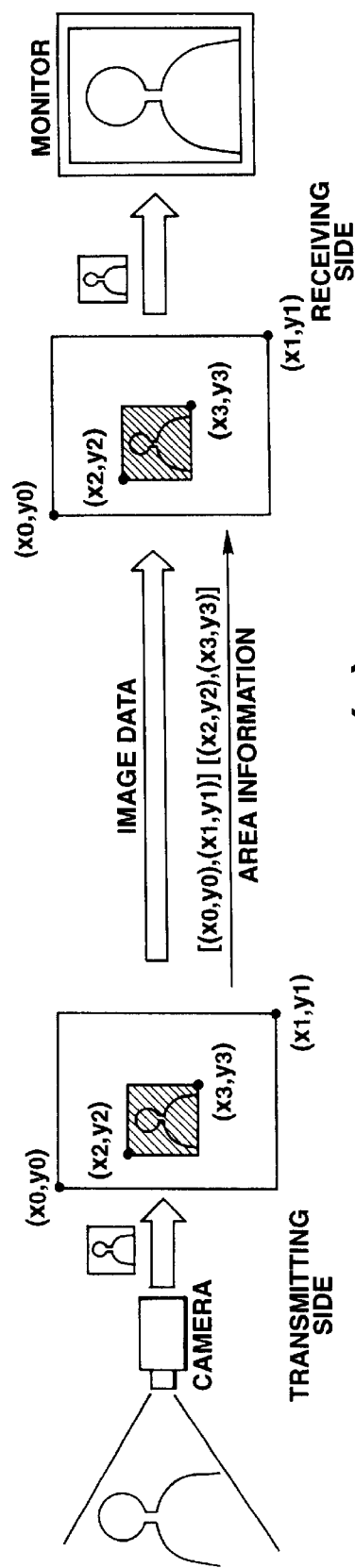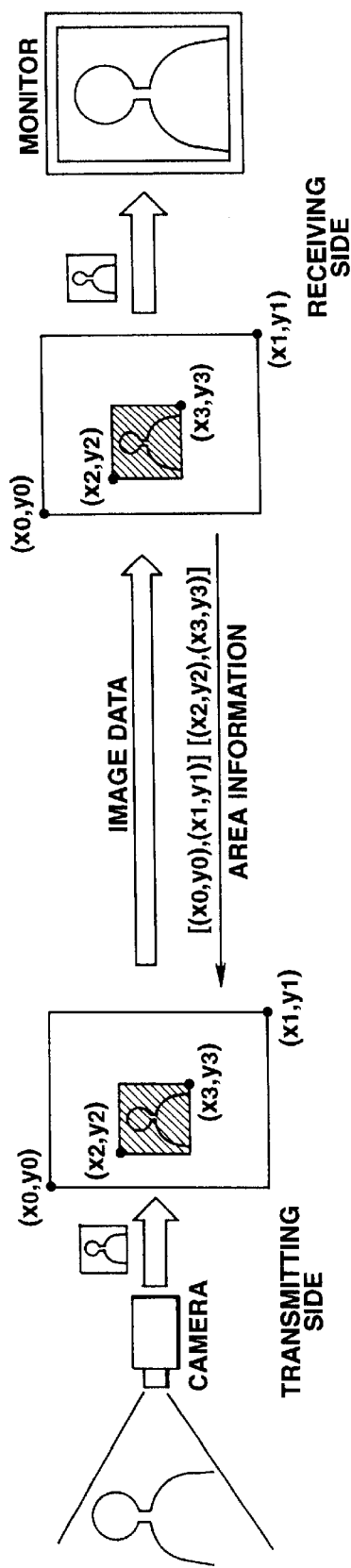

IMAGE COMMUNICATION APPARATUS AND SYSTEM

BACKGROUND OF THE INVENTION

1. Field of the Invention

The present invention relates to an image communication apparatus and system.

2. Description of the Related Art

In the case of using a conventional analog telephone circuit as a communication apparatus, the telephone itself can transmit only voice data, and all other types of data can be transmitted only at low speed.

Recently, however, as a result of progress in communication technology, semiconductor technology and optical technology, digital networks have been provided, which make it possible to transmit large quantities of data at high speed.

Such digital transmission has advantageous features in that, for example, the same level of data quality can be maintained without degradation during data transmission. Also, a particular transmission channel corresponding to the characteristics of the kind of transmitted data is not required, and therefore all types of media can be accommodated. Hence, it has become possible to perform transmission between complex multimedia terminals and, as a result, multimedia communication apparatuses are utilized in which a telephone can simultaneously transmit images as well as voice data.

International standardization by the ITU-T has intended to ensure that mutual communication can be performed between terminals which deal with voice data and image data, and service provisions, protocol provisions, and provisions for the configuration of multimedia multiplexed frames for AV (audiovisual) services, such as video telephones, video conferences, and the like using a digital network, have been announced as H.320, H.242, H.221 and H.261 as recommended by the ITU-T.

In H.221, the frame configuration, exchange of terminal capabilities, and code allocation of an FAS (Frame Alignment Signal) and a BAS (Bit Allocation Signal) in a communication mode in an AV series for 64 Kbits to 1920 Kbits are defined.

In H.242, protocols for the exchange of capabilities between AV terminals using a BAS, the switching of the communication mode, and the like are defined. In H.320, system aspects for all AV services are defined.

In the above-described recommendations, methods are provided for performing the communication of multimedia, comprising images, voice, data, and the like between terminals according to procedures, such as a sequence of in-channel exchanges of terminal capabilities using a BAS, a mode-switching sequence by assigning a communication mode and the like after setting of an end-to-end physical connection and in-channel establishment of synchronization using a FAS.

However, methods for changing the capabilities of a terminal in accordance with a new situation, and methods of selecting a communication mode within the range of exchanged capabilities are not provided.

In multimedia communication, the information transfer speed for voice information is determined by assigning a voice-encoding method, and the transfer speed for data information is determined by assigning the value of the transfer speed when data information is transferred. The transfer speed for image information is obtained by subtracting the transfer speed for voice transformation and the transfer speed for data information from the set information transfer speed of the entire communication channel. A coding method and image data transfer format is defined by H.261.

However, such conventional communication apparatus has certain problems. For example, in such conventional communication apparatus, it is not possible to change image format, because the image format of H.261 has been already defined.

In H.261 a selection is made between CIF (Common Intermediate Format) that is a high quality image, and QCIF (Quarter CIF) that is an ordinary quality image, therefore, the variable quality of an image cannot be changed.

The size of an input has to be enlarged or reduced in order to fit to the H.261 format when the size of the input image is different from that of H.261. Such enlarging or reducing may reduce the quality of the image.

In conventional communication apparatus, in order to transmit a combined image with a static image and a motion image, the static image and the motion image must be transmitted according to the H.261 format. In other words two frames have to be transmitted in order to combine the images.

At a receiving side, a received motion image is enlarged or reduced prior to being combined with the static image. Such a combining process requires more time than an ordinary process that does not need the combining process. Such an enlarging process causes an increase in the amount of information to be transmitted, therefore such an enlarging process causes inefficiency in communication.

SUMMARY OF THE INVENTION

It is an object of the present invention to provide a communication apparatus and method which solves the above-described problems, or at least solves one of the problems.

Another object of the present invention is to provide a method and apparatus for improving the quality of an image that is transmitted through a communication channel or line.

Still another object of the present invention is to provide a method and apparatus for producing a quality image in an acceptable amount of time from a partner's terminal.

Another object of the present invention is to improve the efficiency of a communication apparatus and system.

Still another object of the present invention is to prevent the waste of time in communication.

Still another object of the present invention is to eliminate the waste of time due to inefficiency of communication.

The foregoing and other objects, advantages and features of the present invention will become more apparent from the following detailed description of the preferred embodiment taken in conjunction with the accompanying drawings.

BRIEF DESCRIPTION OF THE DRAWINGS

FIG. 6 illustrates the structure of BCH error correction frames.

FIG. 7(a) is an example of validating each macro block of a CIF format designated by a block unit.

FIG. 7(b) is an example of validating each macro block of a QCIF format designated by a block unit.

FIG. 9 is an example of the contents of the validity table 26-1 adapted to CIF as shown in FIG. 7(a).

FIG. 10 is an example of the contents of the validity table 26-1 adapted to QCIF as shown in FIG. 7(b).

FIG. 12 is a block diagram of a modification of the transmitting image editing unit 16-1.

FIGS. 16(a) and 16(b) illustrate modifications of FIGS. 11(a) and 11(b).

DETAILED DESCRIPTION OF THE PREFERRED EMBODIMENT

Preferred embodiments of the invention will be described as follows with reference to the drawings.

Figure 1:
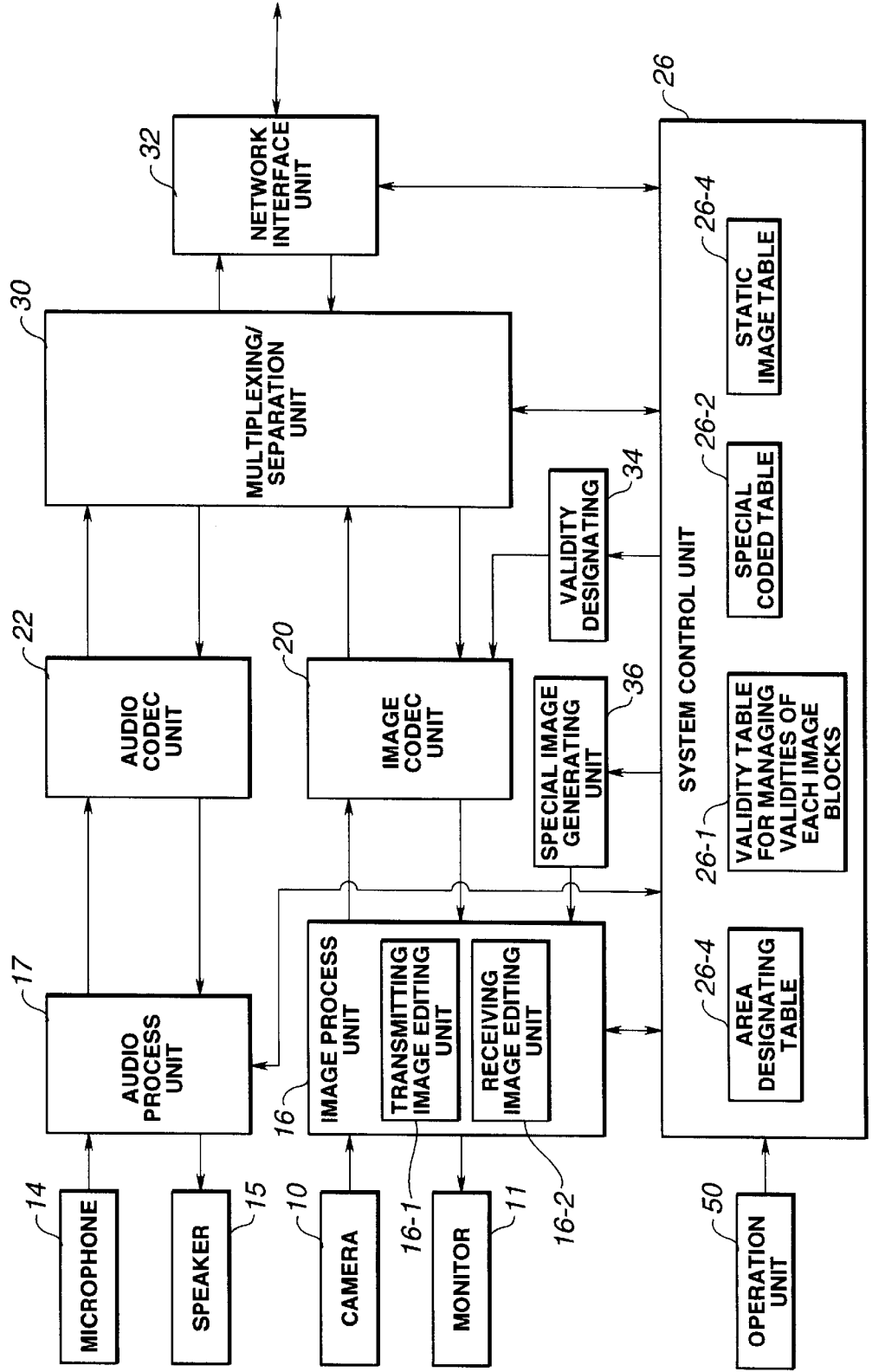
FIG. 1 is a block diagram of an apparatus of a preferred embodiment of the present invention.

FIG. 1 is a block diagram of the first embodiment of the present invention.

In FIG. 1, a camera 10 is used to photograph, for example, a group of people attending a meeting. An image display monitor unit 11 comprises a CRT (cathode-ray tube), a liquid-crystal display unit, or the like. An image processing unit 16 processes one of the images output from the camera for transmission, and supplies the image display monitor unit 11 with an image obtained by selecting and synthesizing images output from the camera 10 and received images in order to display the image. An image codec unit 20 encodes an image signal to be transmitted, which is output from the image processing unit 16. The image processing unit 16 comprises a transmitting image editing unit 16-1 and a receiving image editing unit 16-2, details of which will be described later. The Codec unit 20 performs band compression of the image signal input from the image processing unit 16 by performing one or more of movement compensation, frame skipping, interframe compensation, intraframe compensation, DCT, vector quantization transformation, and the like. H.261 recommended by the ITU-T is an encoding method which can transmit data at 64 Kbps at a basic interface of an ISDN. Also shown are a microphone 14 and a speaker 15. An audio processing unit 17 performs an interfacing operation with the microphone and the speaker 15. The audio processing unit 17 not only switches the voice input/output for the microphone 14 and the speaker 15, but also performs adjustment of the sound level, echo cancel processing, and the processing for generating tones, such as a dial tone, a ringing tone, a busy tone, a call-reception tone, or the like. An audio codec unit 22 encodes a voice signal to be transmitted from the audio processing unit 17. The codec unit 22 decodes a received encoded voice signal, and outputs the decoded signal to the audio processing unit 17. The transmission speed and the encoding method comprises a 64 Kbps PCM (A-law), 64 Kbps PCM ($\mu$-law 7 KHz audio (SB-ADPCM), 32 Kbps ADPCM, 16 Kpbs (for example, LD-CELP), 8 Kpbs, or the like.

A network interface unit 32 connects the apparatus to a communication network, such as an ISDN or the like. A multiplexing/separation unit 30 multiplexes image information, voice information, data information and control information to be transmitted in accordance with the H.221 format, supplies the network interface unit 32 with the resultant data, and separates received information supplied from the network interface unit 32 into image information, voice information, data information and control information.

The system control unit 26 comprises a CPU. A ROM, a RAM, a supplemental storage device, a character generator, and a video signal generator, checks conditions of parts of the apparatus and displays information based on a checked condition, and displays operation information for a user. The system control unit 26 includes plural tables 26-1~26-3.

A validity table 26-1 manages validities of each image block designated by a validity designating unit 36. A a special coded data table 26-2 manages a special coded image. A static image table 26-3 manages a static image. A validity designating unit 34 designates validities of each block of an image in accordance with instructions from the system control unit 26 that controls a control unit 34 based on the validity table 26-1. A special image generating unit 36 converts text data or graphic data, which is inserted into an image, into bit map data and transfers the bit map data to the image processing unit 16. An operation unit 50 inputs various kinds of instruction information to the system control unit 26, and includes, for example, a keyboard, a touch panel, a digitalizer and a pointing device, such as a mouse or the like. In the present embodiment, validities of each image block are managed by the validity table 26-1, and they are transferred in advance of the image data between the apparatuses shown in FIG. 1.

Figure 2:
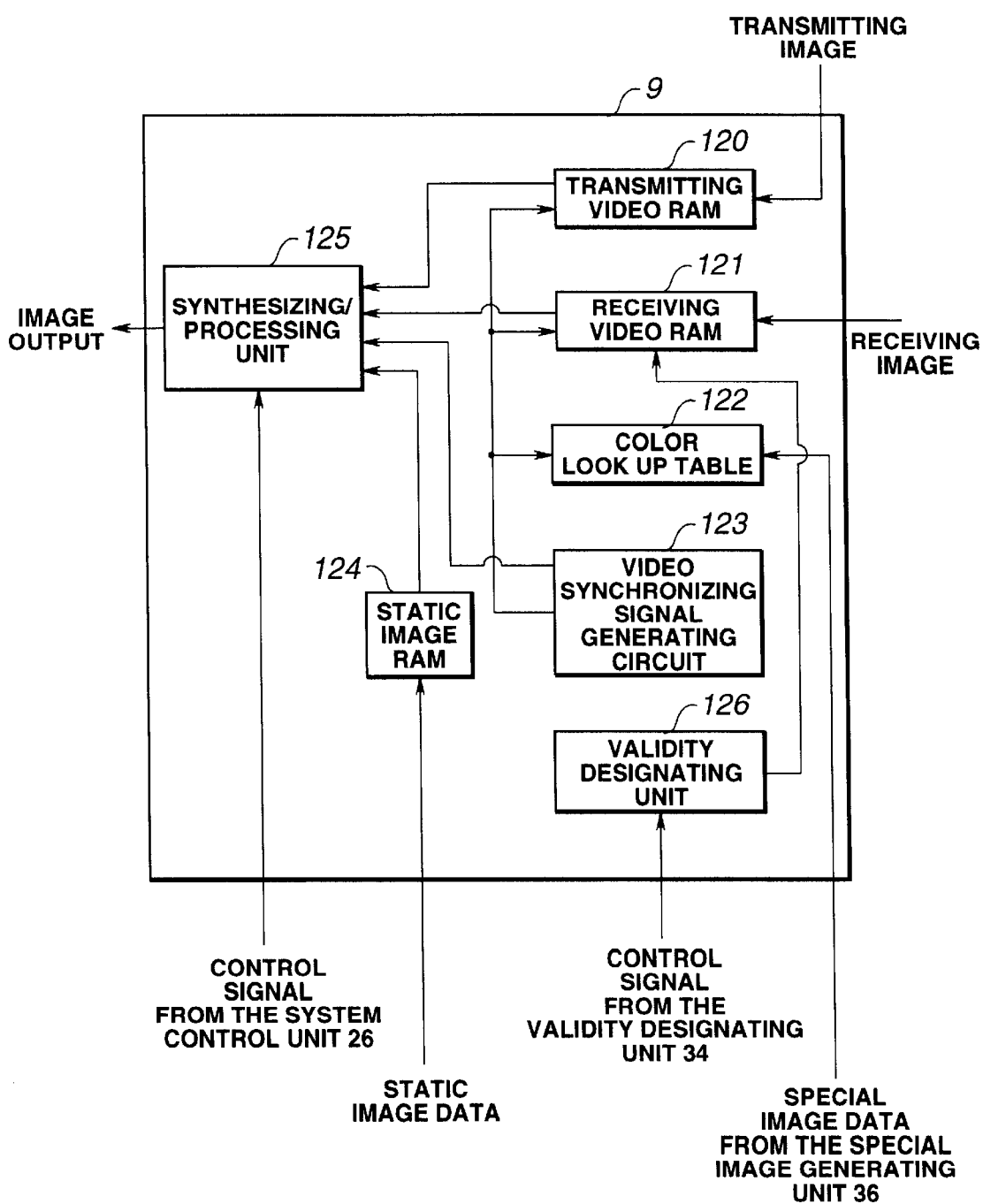
FIG. 2 is a detailed block diagram showing the configuration of the receiving image unit 16-2 according to the embodiment of the present invention.

FIG. 2 is a block diagram showing a detailed configuration of the receiving image editing unit 16-2.

Referring to FIG. 2, a transmitting video RAM 120 stores image data input by the camera 10, and which is to be subsequently transmitted. A receiving video RAM 120 stores image data decoded by the image codec unit 20, and a color look up table 122 converts the special image transmitted from the special image generating unit 36 into color image data. A video synchronizing signal generating unit 123 generates a horizontal sync signal and a vertical sync signal which are provided to the video RAM 120, the video RAM 121 and the look up table 122. A static image RAM 124 stores the static image based on the static image table 26-3 in FIG. 1.

An image synthesizing/processing unit 125 enlarges or reduces the size of an image read out from the receiving video RAM 121 and selects one or more images from among the image data from the RAM 21, an image data from the color look up table 22, and an image data from the static image RAM 124, and for synthesizing the selected image and outputting to the monitor 11 shown in FIG. 1. A validity designating unit 126 designates a valid area of an image based on the validity table 26-1.

The receiving image editing unit 16-2 may generate data which is used for displaying a full special image on monitor 11, and which is based on image data from the color look up table 122 that converts the special image from the special image generating unit 36 shown in FIG. 1. It may also generate data which is used for displaying partial images from the transmitting video RAM 120 and the receiving video RAM 121 of the full image on the monitor 11.

In other words, the receiving image editing unit 16-2 is able to display the transmitted image and received image simultaneously on the monitor 11. In addition, the unit 16-2 is able to display the special image from the special image generating unit 36 on the transmitted image and the received image, a so-called superimposed display. Moreover, the unit 16-2 is able to. selectively display one of the transmitted image and the received image when the images are overlapped with each other.

The detail of the image codec 20 shown in FIG. 1 will be described with reference to FIG. 3.

Figure 3:
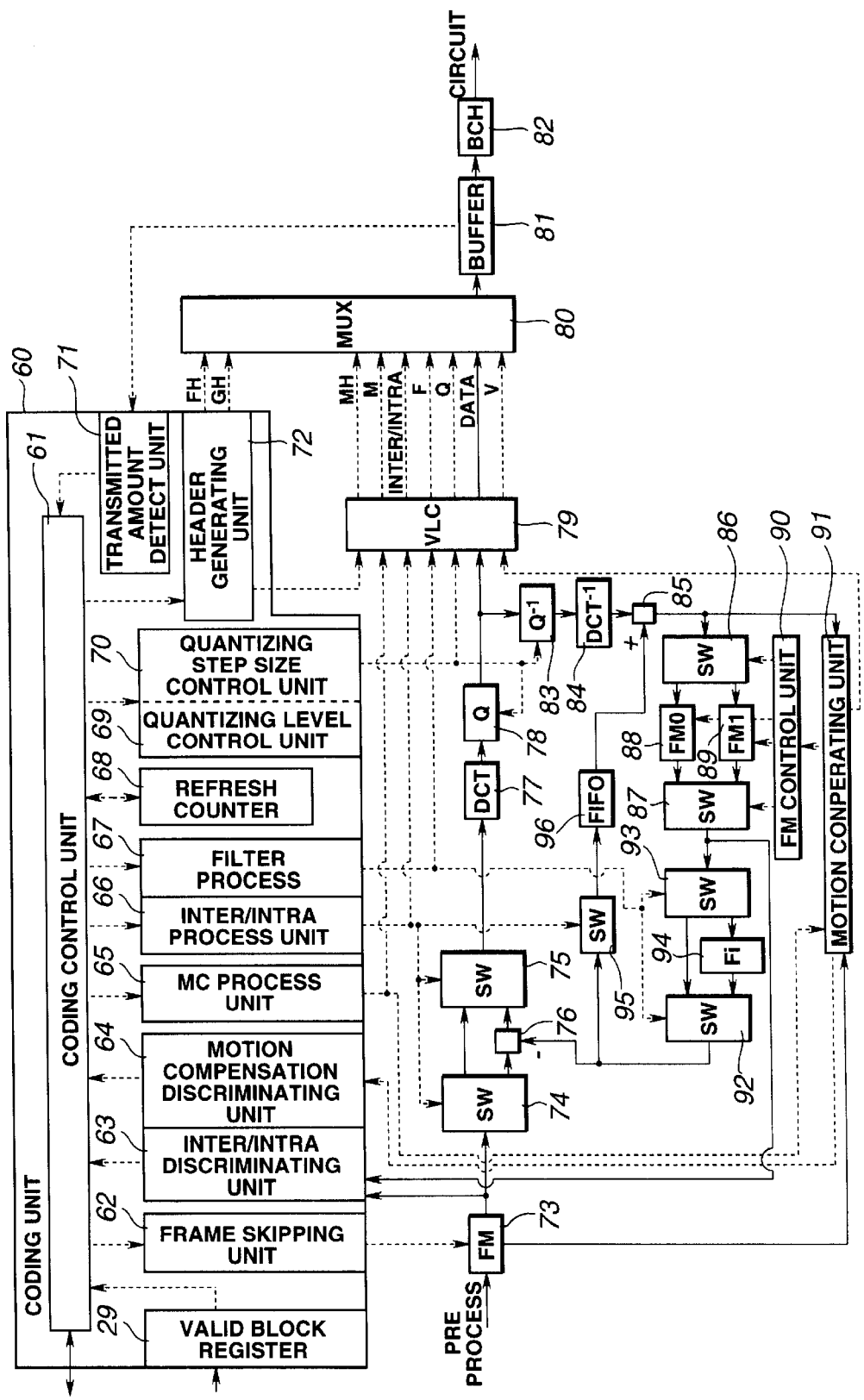
FIG. 3 is a detailed block diagram showing the configuration of the image codec 20.

Referring FIG. 3, a coding unit 60 perform coding under control of a coding control unit 61 for controlling parts of the codec 20 and generating required information. A frame skipping unit 62 reduces information to be coded by skipping a frame.

A INTER/INTRA discriminating unit 63 discriminates a better mode INTER mode (an interframe differential coding method), which extracts the difference between 2 consecutive frames, and an INTRA mode which encodes the current image data without referring to the previous frame by calculating the mean square error or variance of an identical portion of a micro block (MB) of 2 consecutive frames. A motion compensation discriminating unit 64 discriminates whether or not motion compensation (MC) is to be performed by searching a similar block of the previous frame to a predetermined block of the current frame. A MC processing unit 65 performs motion compensation in accordance with the discrimination of the discriminating unit 64. An INTER/INTRA processing unit 66 performs INTER processing or INTRA processing in accordance with the discrimination of the INTER/INTRA discriminating unit 63. A filter processing unit 67 filters an output from the MC processing unit 65. A refresh counter 68 counts the number of INTER coded frames in order to select INTRA processing of a predetermined interval, because the quality of the image reproduced and displayed at the receiving side is undesirably impaired when a transmission error occurs during a large number of INTER processing. A quantizing threshold level control unit 69 controls a quantizing threshold level in order to improve the efficiency of coding by omitting low level data. A quantizing step control unit 70 controls a quantizing step in accordance with a stored amount in a transmitting buffer 81. A transmitted amount detect unit 71 detects the stored amount in the buffer 81. A header generating unit 72 generates a frame header, GOB (Group Of Block) header, and a MB header.

A valid block register unit 29 registers valid block in accordance with information from the validity designating unit 34 shown in FIG. 1. The coding control unit 61 omits a decoding/coding operation on a macro block that is designated in accordance with the validity designating unit 34. A frame memory 73 received pre-processed data, and switches 74 and 75 select one of the INTER frame process and the INTRA frame process. A subtractor 76 subtracts a previous frame from a current frame, and a DCT (Discrete Cosine Transform) unit 77 performs an orthogonal transform on input image data. A quantizer 78 quantizes the data from the DCT 77, and a VLC (Variable Length Coding) unit 79 variable-length-codes an output of the quantizer 78. A multiplexor 80 multiplexes the data from coding unit 60 and VLC 79. A transmitting buffer 81 transmits data from multiplexor 80 to a BCH unit 82 which generates an error correction frame. A de-quantizer 83 dequantizes data from quantizer 78 for input to a de-DCT 84. An adder 85 adds a previous frame and a current frame. Switches 86 and 87 select a frame memory 88 or 89 to be written into, or to be read out of. A FM control unit 90 controls the switching status of the switches 86 and 87 and frame memories 88 and 89. A motion compensating unit 91 compensates for motion by searching blocks of a previous frame in order to form motion compensation for a current frame. Switches 92 and 93 select a process of a filter process unit 94. A switch 95 selects data input to a FIFO memory 96. Referring to FIG. 3, the solid lines represent output/input of the image signal and the dotted lines represent output/input of the control signal.

The structure of the transmission frame will now be described briefly by referring to FIG. 4.

In H.261 in order to communicate in different countries, a common image format is defined instead of NTSC, PAL or HDTV. This embodiment transmits and receives image data based on an image format called "CIF format". The CIF format uses Y, Cb and Cr signals. The frame of Y signals consists of 352 horizontal×288 vertical pixels. Each frame of Cb and Cr signals consists of 176 horizontal×144 vertical pixels. Each data frame of Cb and Cr signals consists of 176 horizontal×144 vertical pixels. Each data has an 8-bit data width. A frame of a CIF-format image is composed of 12 blocks called "GOB". Each GOB is composed of 33 macroblocks (MBs). Each macroblock is composed of 6 blocks consisting of four blocks for the Y signal, one block for the CB signal and one block or the Cr signal. Such blocks are processed as follows. GOBs are processed in the sequence of GOB No. 1 through No. 12. The macroblocks in each GOB are processed in the sequence of MB No. 1 through No. 33, and the blocks in each macroblock are processed in the sequence of Y block No. 1 through No. 4, the Cb block and then the Cr block.

Figure 4:
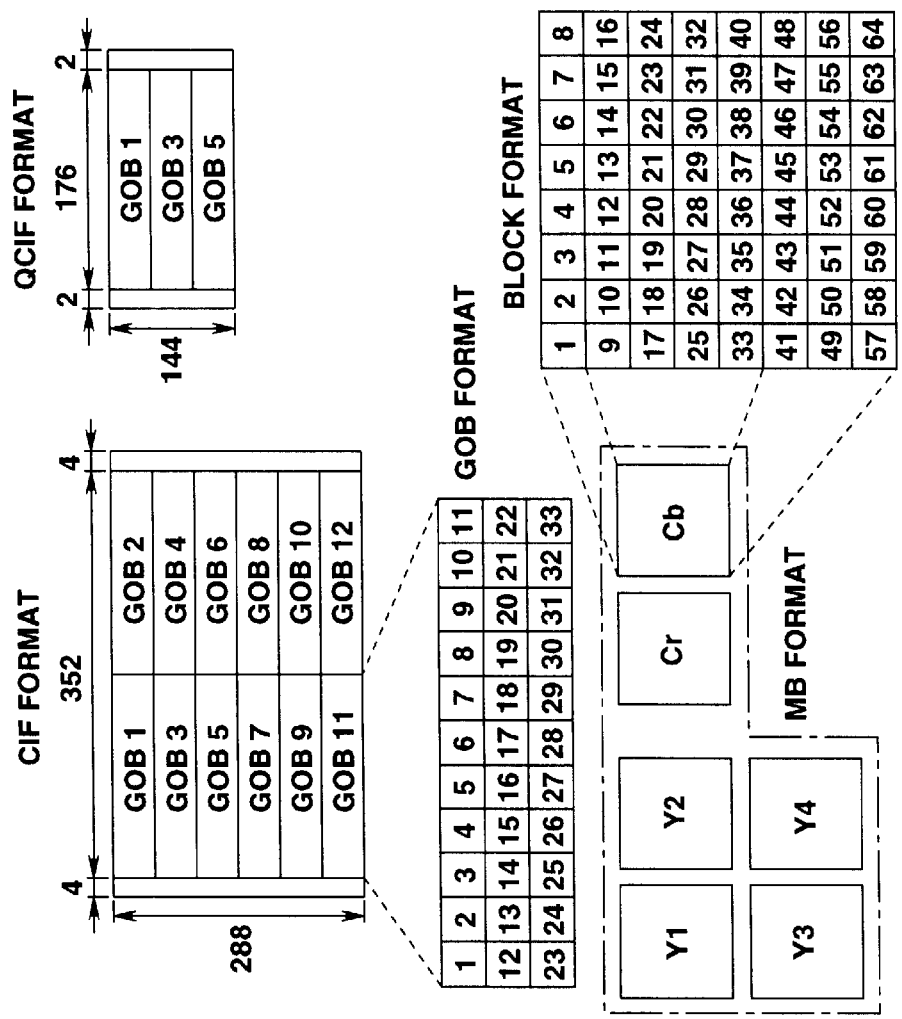
FIGS. 4(a) and 4(b) illustrate the pixel construction according to the CIF format and QCIF format.

FIG. 4(*a*) illustrates the structure of pixels of the CIF format of this embodiment. The frame and GOB sizes of Cb and Cr frames are half the frame and GOB sizes of a Y frame. A macroblock is composed only of a Cb or Cr block. Four Y blocks, one Cb block and one Cr block constitute a macroblock.

In this embodiment, the image codec unit 20 selectively uses three modes, that is, INTER (interframe), MC (motion compensation) and INTRA (intraframe) modes every macroblock, in accordance with the status of the macroblock to the processed.

Figure 5:
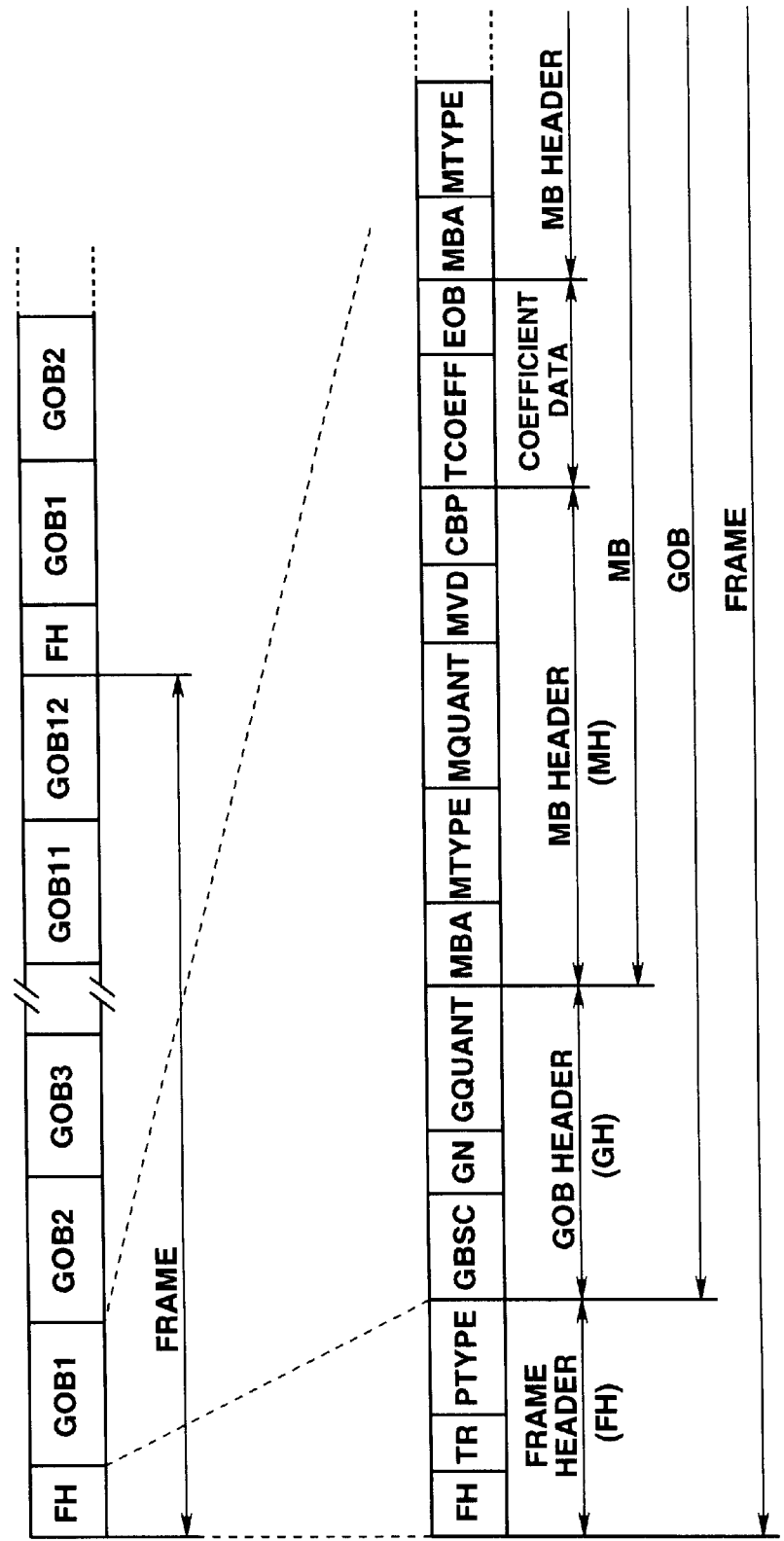
FIG. 5 illustrates the structure of image data multiplexing frames.

FIG. 5 illustrates the structure of the multiplexed frame. As mentioned above, one image frame is sectioned into 12 blocks (in the case of the CIF, it is sectioned into 3 blocks in the case of the QCIF as described later). One of the blocks is formed into a group of blocks (GOB), and data in each GOB is sequentially transmitted after the frame header FH has been transmitted. A method of sectioning the GOB is shown in FIG. 4. The GOB is arranged to have a number of samples of 176 pixels×48 lines for the brightness and 88 pixels×24 lines for the color differences Cr and Cb. The foregoing quantity is ½ of the CIF format and ⅓ of the QCIF format. As contrasted with the CIF format in which numbers are given to the GOBs from 1 to 12, the QCIF format is arranged in such a manner that numbers are given to the GOBs as 1, 3 and 5.

FIG. 5 also illustrates the detailed structure of the frame header FH and the leading portion of the ensuing GOB1. The frame header FH is composed of 20-bit frame start code PSC, a 5-bit frame No. TR and a 6-bit type information PTYPE. The frame start code PSC has a structure "10000 0000 0000 0001 0000". The value of TR ranges from "1" to "30". The type information PTYPE is composed of split screen instruction information, a document camera instruction information, and image frame freezing cancellation and information-source format instruction information (information indicating CIF or QCIF).

The GOB region includes a GOB header, and a required number of pairs each consisting of a MB header and coefficient data following the GOB header. One GOB is composed of 33 macroblocks (MB) each of which is composed of 6 blocks (four brightness signals Y, one color difference signal Cr and one color difference signal Cb) of 8 pixels×8 lines. The blocks of the brightness signal are given numbers 1 to 4. the color difference signal Cb is given number 5, and the color difference signal Cr is given number 6.

The GOB header is composed of a 16-bit GOB start signal (BGSC), a 4-bit GOB No. (GN) and a 5-bit quantization characteristic information (GQUANT). The GBSC has a structure "0000 0000 0000 0001". The value of GN ranges from "1" to "12". Assuming that GN is "0", GBSC+GN of PSC of FH and that of GOB of FH are 20 bits, causing continuous same bit columns to be formed. Therefore, "0" cannot be allocated to GN. The quantization characteristic information GQUANT is information about the quantization step size.

The MB header is composed of a macroblock address (MBA) indicating the position of the macroblock (MB), macroblock type information (MTYPE), quantization characteristic information (MQUANT), movement vector information (MVD) and significant block pattern information (CBP).

The macroblock address MBA is an absolute value with respect to the macroblock, and it is a relative value (the difference) with respect to the ensuing macroblock, the macroblock address MBA having a variable length. The macroblock type information MTYPE indicates the type of the process to which the macroblock has been subjected, the process being intra-frame encoding (INTRA) process, an inter-frame difference encoding (INTER) process, a movement compensated inter-frame difference encoding (MC) process and a filtering process (FIL). The quantization characteristic information MQUANT is the same as GQUANT. The significant block pattern information CBP has, as information, effective block Nos. in the four blocks as the brightness signal 1–4 in the macroblock and the blocks of the color difference signals Cr and Cb 5, 6.

Following the MB header image data formed into the compressed code TCOEFF is present as described above such that significant blocks of the four brightness signal blocks and blocks of the color difference signals Cr and Cb are present.

PSC of the frame header FH and GBSC and GN of GOB are selected so as to be a sole data pattern in order to detect the frame header and the GOB header at the time of the decoding operation. The data structure shown in FIG. 5 is an added error correction frame by BCH82 shown FIG. 3 to become a transmission frame and is transmitted through a network.

The structure of the transmission frame will now be described briefly. FIG. 6 illustrates the structure of an error correction frame by using a BCH code. One frame is composed of a 1-bit error correction frame bit, a 1-bit file identifier that indicates whether the following data is image data or not, a 492 bit image data, and an 18-bit error correction parity, the one frame therefore has 512 bits. One multiframe is composed by collecting 8 frames each of which is structured as described above.

As described above, a plurality of compression techniques can be combined, so that moving images can be transmitted even in communications having a low transfer rate.

Compression methods are as follows: (1) intraframe encoding which utilizes such facts as, for example, that there is a strong correlation between pixels in an image taken from the natural world, low-frequency components are dominant and high-frequency components are in the minority. Data within a frame is divided into blocks of 8 pixels×8 pixels, and is subjected to two-dimensional DCT. (2) Intraframe encoding is also used, in which the difference between frames is obtained when there is a strong correlation between image blocks at the same position of the preceding frame and the current frame, and each block of 8 pixels×8 pixels is subjected to two-dimensional DCT using the difference value. (3) Also used is movement compensation in which the movement of an analogous image block from the preceding frame to the current frame is detected, and only information relating to the amount and the direction of the movement is transmitted without transmitting the image data itself, whereby the amount of data generated is reduced. (4) Zero-run-length encoding utilizes the fact that the coefficient value for each frequency after DCT is generated in low-frequency regions, but is rarely generated in high-frequency regions where zero values will therefore continue. (5) Also used is quantization in which the amount of data generated is adjusted by changing the width of the quantization steps for data in accordance with the amount of data generated. (6) Variable-length encoding in which the amount of generated data is reduced by allocating short code values to data patterns having a high frequency of generation and allocating long code values to data patterns having a low frequency of generation. (7) Frame skipping in which part of the image data is omitted.

A method of designating the validity of each macro block (MB) is described with reference to FIG. 7. FIG. 7(a) is an example of validating each macro block of the CIF format designated by a block unit. FIG. 7(b) is an example of QCIF.

Referring to FIGS. 7(a) and 7(b), white macro blocks represent invalid blocks, dotted macro blocks represent invalid and special images containing blocks, and black macro blocks represent valid blocks.

Figure 8A:
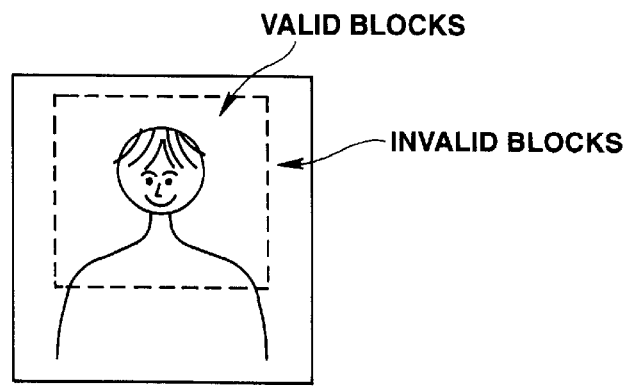
FIGS. 8(a), 8(b), and 8(c) are examples of a display on a monitor.

An actual example of display on the monitor 11 shown in FIG. 1 will be described by referring to FIG. 8. FIG. 8(a) is an example of a display on the monitor 11. In FIG. 8(a), the inside of the dotted line represents valid blocks, and the outside represents invalid blocks.

Figure 8B:
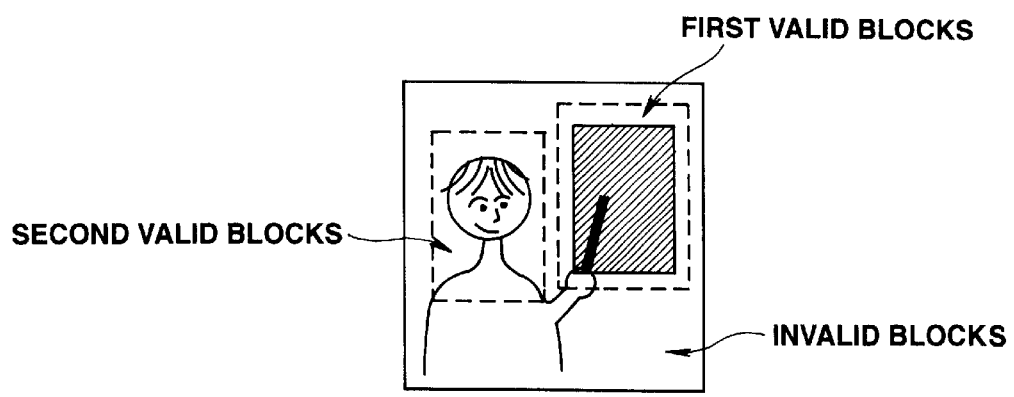

FIG. 8(b) is an example of a display on the monitor 11. In FIG. 8(b), the inside of the first dotted line and the second dotted line represent valid blocks, and the outside of both of them represent invalid blocks. In the present embodiment, plural areas are designated as valid areas in order to code various kinds of images efficiently.

Figure 8C:
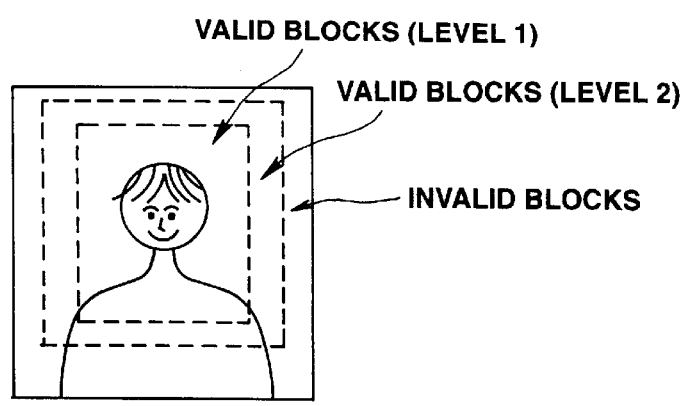

FIG. 8(c) is an example of designating plural level validity within valid blocks. In FIG. 8(c), the most inside area represents valid blocks, an area between the dotted inside line and the outer dotted line represents an invalid and special image containing block, and the outside of the outer dotted line represents invalid blocks.

In the present embodiment, in a first mode image data of invalid blocks is initially transmitted once, and in a second mode the image data of the invalid blocks is not transmitted initially and are selectable by the operation unit 50 shown in FIG. 1.

An example of the validity table 26-1 will be described by referring to FIG. 9 and FIG. 10. FIG. 9 is an example of contents of the validity table 26-1 adapted to the CIF format shown in FIG. 7(a). Referring to FIG. 9, the MB number is designated and managed as a combination of GOB No. and START MB No. and END MB No.

The GOB No. represents one of GOB1 to GOB12 shown in FIG. 4(a). The START MB No. represents a beginning macro block of a valid area, for instance one of MB1 to MB33 shown in FIG. 4(a). The END MB No. represents an ending macro block of a valid area. In other words blocks between START MB No. and END MB No. and the START MB and END MB are valid macro blocks.

Therefore, it is possible to designate plural valid areas or valid levels shown in FIGS. 8(b) and 8(c) by designating plural START MB Nos. and END MB Nos. within one macro block. Referring to FIG. 9, the table 26-1 contains information about special image data and content of the special image. Therefore, the table 26-1 manages the position of the special image to be overlaid on an image and its contents. FIG. 10 is an example of the validity table 26-1 adapted to the QCIF format shown in FIG. 7(b). The GOB No. represents one of GOB1, GOB3, and GOB5 shown in FIG. 4(a). The START MB Nos. and END MB Nos. shown in FIG. 10 are similar to those in FIG. 9. In FIG. 10 GOBNos. except for the above Nos. represent invalid blocks without a special image. According to the configuration of FIG. 9, the memory capacity of table 26-1 can be reduced. How the contents of table 26-1 are used will be described by referring to FIG. 11. FIG. 11 is a diagram showing the flow of the image data and validity information related to the contents of the table 26-1 between a transmitting side and a receiving side. There are similar apparatuses as the one explained above in both the transmitting and receiving sides.

Figure 11A:
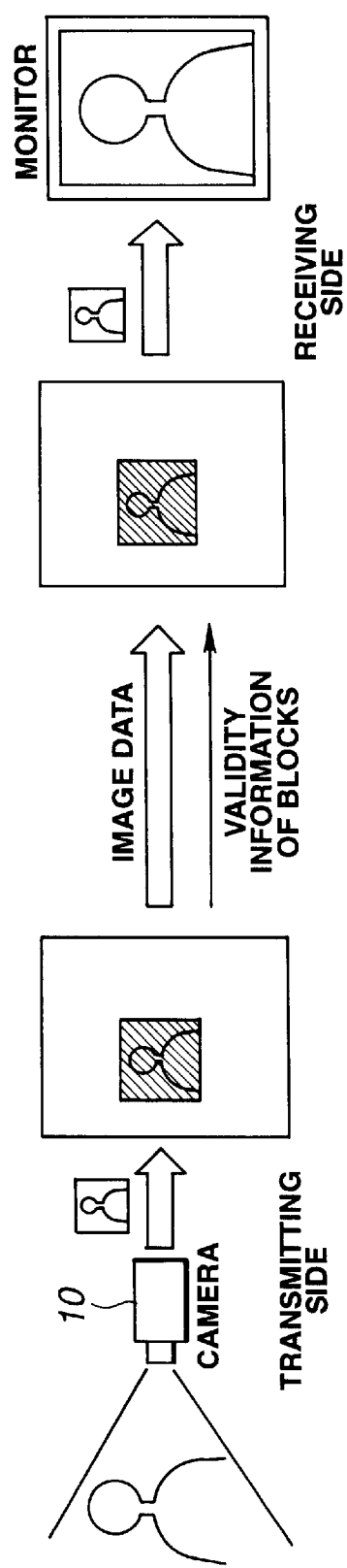
FIGS. 11(a) and 11(b) illustrate communication steps of the preferred embodiment.

FIG. 11(a) illustrates that the transmitting side transmits the contents of the table 26-1 to the receiving side. In this case, the transmitting side captures an image to be transmitted by the camera 10, and codes the captured image data by using the codec 20, details of which were described relative to FIG. 3 based on the contents of the table 26-1 (validity information of blocks) first, and transmit coded image data.

The receiving side receives the contents of the table 26-1 (validity information of blocks) and the coded image data, decodes the coded image data, and writes the decoded image data in the receiving video RAM 121 at the receiving side. When the receiving side displays only the valid area, the system control unit 26 of the receiving side controls the synthesizing/processing unit 125 so that unit 125 extracts a part of the image stored in the receiving video RAM 121 based on the validity information of the blocks. The synthesizing/processing unit 125 synthesizes the static image stored in the static image RAM 124 with the output of the color look up table 122 or the extracted part of the image. The system control unit 26 at the receiving side is able to change positions of the static image, the output of the color look up table and the extracted part in response to the control signal.

Figure 11B:
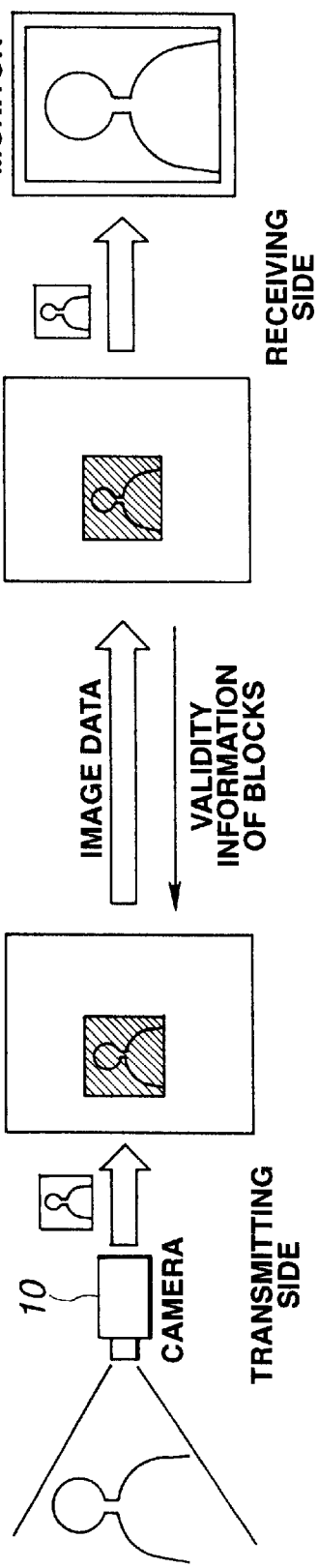

FIG. 11(b) illustrates that the receiving side generates validity information of blocks and transmits them to the transmitting side, and the transmitting side transmits coded image data to the receiving side.

Referring to FIG. 11(b), the receiving side generates validity information of blocks in accordance with input information through the operation unit 50 shown in FIG. 1, and transmits the validity information of blocks to the transmitting side shown in FIG. 11(b). The transmitting side receives the validity information of the blocks, and enlarges or reduces the size of the image data from the camera 10 to fit the image data into valid blocks in accordance with the received validity information. The transmitting side encodes the image data and transmits coded image data to the receiving side. The receiving side receives the coded image data and transmits coded image data to the receiving side. The receiving side receives the coded image data and decodes the image data corresponding to the validity information of the block that the receiving side generated.

When an operator at the receiving side decides to display only an image that the transmitting side transmitted, the operator is able to do so by inputting an instruction through the operation unit 50 shown in FIG. 1 into the system control unit 26. Moreover, the operation is able to change the position of the area where the received image is shown, utilizing the operator unit 50. The system control unit 26 controls the synthesizing/receiving unit 125 shown in FIG. 3 in accordance with instructions from the operation unit 50.

Moreover, the control unit 26 is able to control the unit 125 so as to display a composite image of the received image, the transmitted image and a static image.

In the present embodiment the validity information includes plural bits of information for each macro block. However, the validity information is limited to the preferred embodiment and the information may be one bit for each macro block, or may be expressed in other ways, e.g. vector data.

According to the present invention, though the transmission image format is fixed, e.g. CIF or QCIF, it is possible to encode and transmit a smaller size image than the size of the transmission image format. Moreover, according to the present embodiment, the transmitting side is able to omit a decoding/coding operation in accordance with the size of the image. Therefore, the operator can select the size of the image to be transmitted. Therefore, according to the present embodiment, the efficiency of the decoding/coding operation is "improved". Moreover, according to the present embodiment, it is possible to combine the special image with invalid image blocks, and to transmit an image combined of the special image and the motion image from the camera 10. Therefore, the apparatus will be more useful.

According to the present embodiment, it is not necessary for the receiving side to fit a size and a position of the transmitted image into a desired style and position, because the transmitting side fits the size and the position of an image to be transmitted in accordance with validity information of blocks that are transmitted from the receiving side.

Therefore, the communication system will be constructed economically and the quality of the transmitted image will be constructed economically, thus improving the quality of the transmitted image.

The Second Embodiment

The second embodiment will be described as follows by referring to FIG. 12 to FIG. 16.

In the second embodiment, the image processing unit 16 is modified as follows. The validity designating unit 34 of FIG. 1 is replaced by an area detecting unit 35, and the validity table 26-1 is replaced by an area designating table 26-4 that the operator accesses to set area information through the operation unit 50. FIG. 12 is a block diagram of the transmitting image editing unit 16-1.

Referring FIG. 12, an input processing unit 221 converts a composite signal into a R.G$_c$B signal by YC separation and demodulating C. An enlarge/reduce processing unit 222 is used for enlarging/reducing the size of the input image to fit a certain image format. A buffer 223 temporarily stores the image data from buffer 223 to adjust the timing. A static image generating unit 224 generates a static image for a memory 227. A selector 225 selects one of the input image data from the buffer 223, the static image from the generating unit 224, or special image data from a transmitting image control unit 235. The generating unit 224 comprises a memory for storing various kinds of static images in accordance with an instruction from the control unit 235. The unit 224 is also able to store image data from the memory 227. A memory write controller 226 generates a write address for the memory 227, and for selecting the selector 225. Area designating units 228 to 230 designate areas of the memory 227 which may be written to.

A memory read controller 231 generates a read address for the memory 227. Designating units 232 to 234 designate reading areas of the memory 227 and for designating the readout time of the memory 227. A transmitting image control unit 235 sets area data to the designating units 232 to 234 and for setting a static image or a special image to the selector 225.

Figure 13:
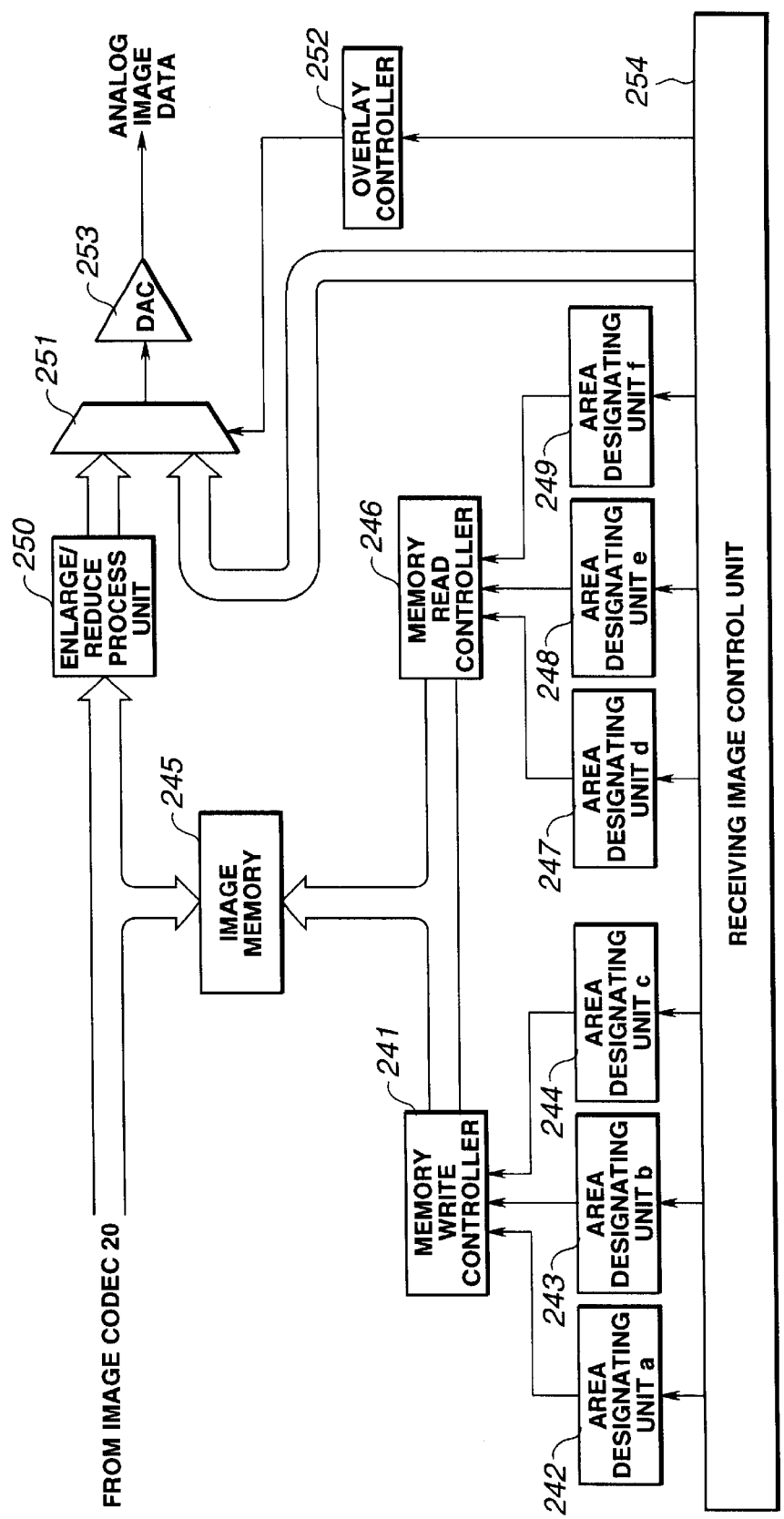
FIG. 13 is a block diagram of a modification of the transmitting image receiving unit 16-2.

FIG. 13 is a block diagram of a modification of the receiving image unit 16-2.

Referring to FIG. 13, a memory write controller 241 generates a write address for a memory 245. Area designating units 242 to 244 designate writing areas of the memory 245. A memory read controller 246 generates a read address for the memory 245. Area designating units 247 to 249 designate read areas of the memory 245.

An enlarge/reduce processing unit 250 enlarges/reduces the size of an input image. A synthesizing unit 251 synthesizes the image data from the unit 250 with special image data from the receiving image control unit 254. An overlay controller 252 controls the synthesizing timing of the synthesizing unit 251 in accordance with an instruction from the unit 254. A DA converter 253 converts a digital output from the synthesizer 251 into an analog signal. The receiving image control unit 254 sets area data for the designating units 242 to 244 shown in FIG. 13, and for outputting a special image. Moreover, the unit 254 controls the overlay controller 252.

According to the configurations shown in FIGS. 12 and 13, the transmitting image editing unit 16-1 is able to fit an input image to a transmitting image area and to fit the static image or the special image from the unit 235 into a part of, or the entire transmitting image area. Moreover, the receiving image editing unit 16-2 is able to select and extract a certain area of the decoded image from the image codec 20 and to overlay the special image from the receiving control unit 254 on the extract image. The transmitting image control unit 235 and the receiving image control unit 254 are controlled by the system control unit 26 shown in FIG. 1 based on the area designating table 26.

Figure 14A:
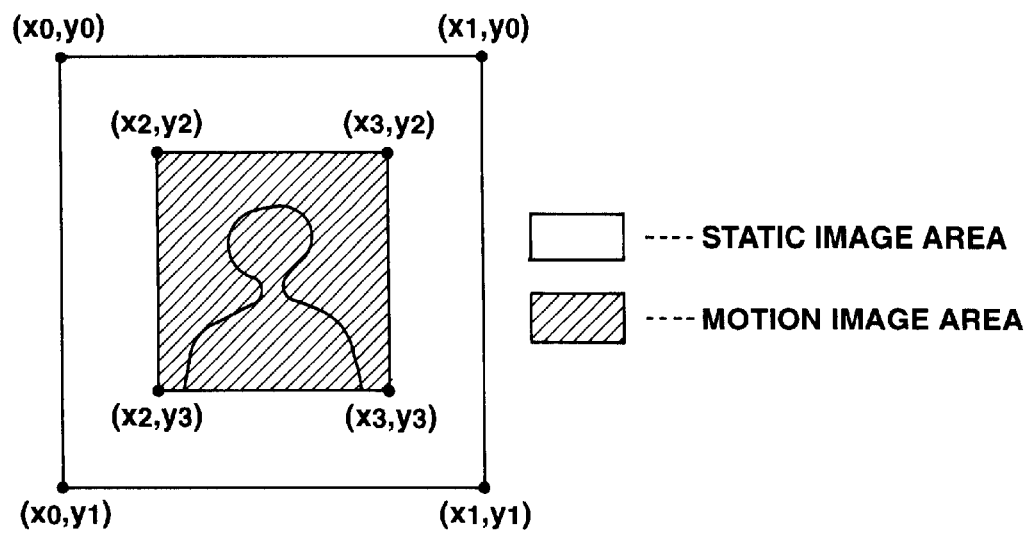
FIGS. 14(a) and 14(b) show examples that include combined images of a static image and a motion image.

Examples of the operations of FIGS. 12 and 13 will be described by referring to FIGS. 14 and 15. FIG. 14(a) shows an example of how the control unit 235 instructs the area designating unit 228 to set a motion image area by $(x_2, y_2)$, $(x_2, y_3)$, $(x_3, y_2)$ an $(x_3, y_3)$ In this case, the memory write controller 226 causes the selector 225 to select an output of the buffer 223 in response to an access of the memory 227 reaching the motion image area as instructed by the control unit 235.

Moreover, in FIG. 14(a), the control unit 235 instructs the area designating unit 229 to set a static image area defined by $(x_0, y_0)$, $(x_0, y_1)$, $(x_0, y_0)$, and $(x_1, y_1)$. In this case, the memory write controller 226 causes the selector 225 to select an output of the static image generating unit 224 in response to the access of the memory reaching the static image area. The area designating units 242 to 244 are selectable unless they conflict with each other.

Figure 14B:
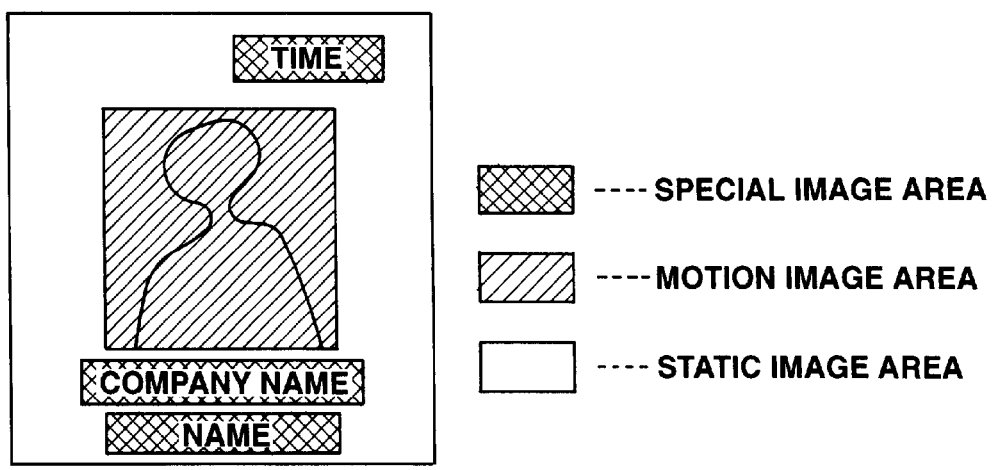

FIG. 14(b) shows an example that the special images from the control unit 235 are combined with the image shown in FIG. 14(a). Addresses of the special images are set to the area designating unit 230, and the unit 30 operates in a manner similar to the units 228 and 229. The area designating units 232–234, 242–244, 247–244, 247–249 operate in a manner similar to the units 226–230. The image data processed by the transmitting image editing unit 16-1 is transferred to the image codec 20.

Figure 15A:
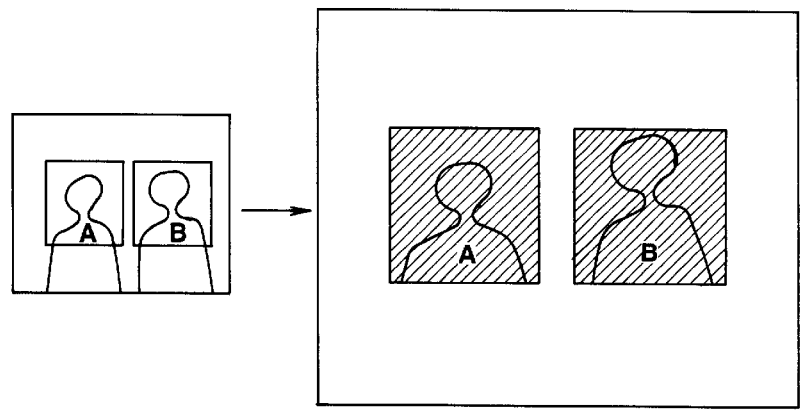
FIGS. 15(a), 15(b) and 15(c) show examples that include combined images of plural motion images.

FIG. 15(a) shows an example that only the main parts, shown as A,B, of the image data output from the camera 10 are written in the memory 227, the static image data, of which information amount is relatively low, is written in the rest area of the memory 227. According to the above process, in the rest of the main parts A,B, the amount of th e code generated by the image codec 20 is relatively low. IN other words, as a result the amount of the code assigned to the main parts A,B, becomes relatively high. Therefore the image quality of the main parts A, B, is improved by the present embodiment. In other words, the efficiency of the coding is improved by the present embodiment.

Figure 15B:
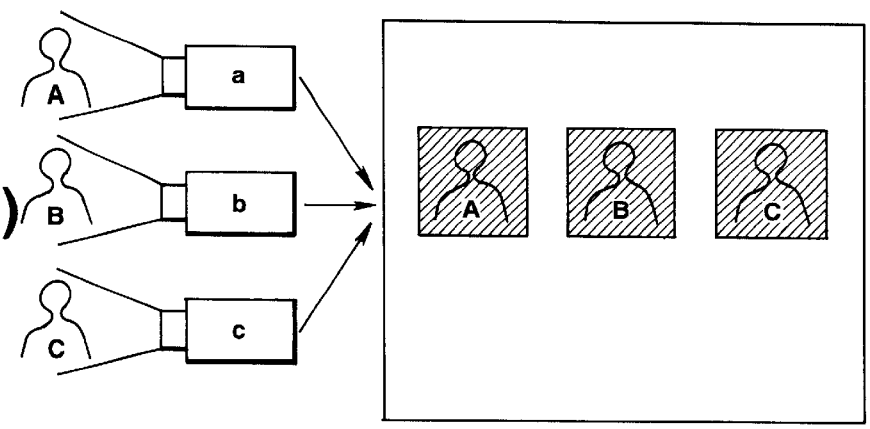

FIG. 15(b) shows an example that images, from plural image input sources a, b, c, are written into, and combined in, the image memory 227. There are two ways to input plural images to the apparatus. The first is that the plural sources a, b, c, transmit image data in response to a common synchronizing signal, and the image processing unit 16 selects one of the images from the sources a, b, c, in order. The second is that plural sources a, b, c, transmit image data asynchronously, and the plural image data are stored in the buffer 223 simultaneously, the stored images are read out in order that these images are written as shown in FIG. 15(b) by the area designating units 228–230 as mentioned above.

Figure 15C:
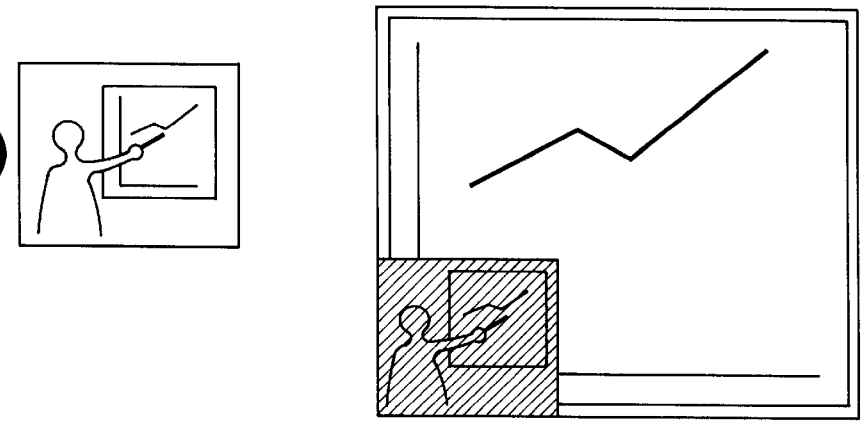

FIG. 15(c) is an example that an image data from the camera 10 is fitted on a static image that covers the entire frame. In FIG. 15(c) the static image is an enlarged partial image extracted from the camera output.

The static image is replaceable by another new static image. In these case, the partial images are extracted from the outputs of the cameras that are motion images, and are combined with a static image.

The encoding method, used in the present embodiment, includes the INTER frame mode. Therefore according to the present embodiment, the efficiency of the coding is improved.

FIGS. 16(a) and 16(b) illustrates modifications of FIGS. 11(a) and 11(b). The differences between FIGS. 11(a) and 11(b) and FIGS. 16(a) and 16(b) are that the validity information of blocks referred to in FIGS. 11(a) and 11(b) are replaced by area information in FIGS. 16(a) and 16(b). The operation of FIGS. 16(a) and 16(b) is similar to that of FIGS. 11(a) and 11(b).

According to the present embodiment, a motion image and a static image are combined and coded by an image codec, e.g. the codec 20 shown in FIG. 3. Therefore the present embodiment avoids the waste of time of transmitting two frames, i.e., a motion image frame and a static image frame.

Although the description has been directed to an image communications system, such as TV telephone system, for transmitting an image in two directions, as shown in FIG. 11(b) and FIG. 16(b), the present invention may, of course, be adapted to a system in which the image is transmitted in only one direction, as shown in FIG. 11(a) and FIG. 16(a).

In this embodiment, a seven layer network, e.g., an ISDN is used. However, the invention is not limited to such an embodiment, and can be applied to a terminal that connects to any other network, e.g. an analog network or a wireless network.

Further, the coding methods used are not limited to those disclosed in this embodiment, and the invention can be applied to the MPEG-II method, or any other compression method.

In addition, the invention is applicable not only to systems including computers and software, but is also applicable to hardware systems.

In summary, according to the present invention, it is possible to receive information promptly concerning a communication partner's multimedia capability. In particular, the partner's identifying information is connected to stored attribution information of the data.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image communication apparatus comprising:

designating means for designating a desired area as a motion image area;

means for combining a motion image and a static image based on the motion image area designated by said designating means; and means for transmitting information representing the motion image area to a communication partner, wherein said designating means designates a size and a position of the desired area in accordance with a manual input and received data from the communication partner, and wherein the desired area is composed of a block unit which divides an image area for image encoding.

2. An image communication apparatus according to claim 1 wherein said designating means designates plural desired areas.

3. An image communication apparatus according to claim 1, further comprising:

means for coding an image combined by said means for combining.

4. An image communication apparatus according to claim 3, wherein said means for coding includes an INTER process.

5. An image communication apparatus according to claim 1, further comprising:

means for generating motion image data.

6. An image communication apparatus according to claim 5, wherein said means for generating includes means for converting an object into an electrical signal.

7. An image communication method comprising:

a designating step of designating a desired area as a motion image area;

a combining step of combining a motion image and a static image based on the motion image area designated by said designating step; and a transmitting step of transmitting information representing the motion image area to a communication partner, wherein said designating step designates a size and a position of the desired area in accordance with a manual input and received data from the communication partner, and wherein the desired area is composed of a block unit which divides an image area for image encoding.

8. An image communication method according to claim 7, wherein said designating step designates plural desired areas.

9. An image communication method according to claim 8, further comprising:

a coding step of coding an image combined by said combining step.

10. An image communication method according to claim 9, wherein said coding step includes an INTER process.

11. An image communication method according to claim 7, further comprising:

a generating step of generating motion image data.

12. An image communication method according to claim 11, wherein said step of generating includes a converting step of converting an object into an electrical signal.

* * * * *

UNITED STATES PATENT AND TRADEMARK OFFICE
CERTIFICATE OF CORRECTION

PATENT NO. : 6,313,863 B1
DATED : November 6, 2001
INVENTOR(S) : Chida et al.

It is certified that error appears in the above-identified patent and that said Letters Patent is hereby corrected as shown below:

Column 2,
Line 16, "to" (second occurrence) should be deleted.

Column 4,
Line 5, "Kpbs," should read -- Kbps, -- and "Kpbs, should read -- Kbps, --; and
Line 23, "a" (second occurrence) should be deleted.

Column 5,
Line 11, "too" should read -- to --;
Line 21, "A" should read -- An --;
Line 43, "processing." should read -- processings. --;
Line 60, "subtractor" should read -- subtracter --; and
Line 66, "teplexor" should read -- teplexer --.

Column 6,
Line 1, "multiplexor" should read -- multiplexer --;
Line 31, "or" should read -- for --; and
Line 36, "block" (first occurrence) should read -- blocks --.

Column 7,
Line 2, " "10000" should read -- blocks --; and
Line 16, "to 4." should read -- to 4, --.

Column 8,
Line 66, "are" should read -- is --.

Column 11,
Line 55, "table 26." should read -- table 26-4. --; and
Line 61, "an $(X_3, Y_3)$" should read -- and $(X_2, Y_3)$ --.

Column 12,
Line 10, "area designating unit 230 and unit 30 operates" should read -- area designating unit 230 and unit 230 operates --;
Line 12, "ing units 232-234, 242-244, 247-244, 247-249 operate in" should read -- ing units 232-234, 242-244, 247-249 operate in --;
Line 20, "area" should read -- of the area --;
Line 21, "th" should read -- the --;
Line 22, "e" should be deleted and "IN" should read -- In --;
Line 45, "these" should read --this --; and
Line 52, "illustrates" should read -- illustrate --.

UNITED STATES PATENT AND TRADEMARK OFFICE
CERTIFICATE OF CORRECTION

PATENT NO.   : 6,313,863 B1
DATED        : November 6, 2001
INVENTOR(S)  : Chida et al.

It is certified that error appears in the above-identified patent and that said Letters Patent is hereby corrected as shown below:

<u>Column 13,</u>
Line 47, "1" should read -- 1, --.

Signed and Sealed this

Twenty-seventh Day of August, 2002

Attest:

JAMES E. ROGAN
Attesting Officer  Director of the United States Patent and Trademark Office